US006887455B2

(12) United States Patent
Carpenter et al.

(10) Patent No.: US 6,887,455 B2
(45) Date of Patent: May 3, 2005

(54) CATALYTIC GENERATION OF HYDROGEN

(75) Inventors: Ian William Carpenter, Bristol (GB); John William Hayes, Reading (GB)

(73) Assignee: Johnson Matthey Public Limited Company, London (GB)

(*) Notice: Subject to any disclaimer, the term of this patent is extended or adjusted under 35 U.S.C. 154(b) by 626 days.

(21) Appl. No.: 09/832,378

(22) Filed: Apr. 11, 2001

(65) Prior Publication Data

US 2002/0127445 A1 Sep. 12, 2002

(Under 37 CFR 1.47)

Related U.S. Application Data

(63) Continuation of application No. 09/646,497, filed as application No. PCT/GB99/00753 on Mar. 23, 1999, now abandoned.

(30) Foreign Application Priority Data

Mar. 24, 1998 (GB) .............................................. 9806199

(51) Int. Cl.[7] .............................................. B01D 53/92

(52) U.S. Cl. ........................ 423/648.1; 429/17; 429/19; 423/650

(58) Field of Search .................. 429/17, 19; 423/648.1, 423/650, 651, 652

(56) References Cited

U.S. PATENT DOCUMENTS

| 4,501,823 | A |   | 2/1985  | Masuda           |         |
|-----------|---|---|---------|------------------|---------|
| 4,897,253 | A | * | 1/1990  | Jenkins          | 423/651 |
| 4,957,896 | A |   | 9/1990  | Matsumoto et al. |         |
| 4,963,521 | A |   | 10/1990 | Engler et al.    |         |
| 5,510,056 | A | * | 4/1996  | Jacobs et al.    | 252/373 |
| 5,531,972 | A | * | 7/1996  | Rudy             | 423/212 |
| 5,980,840 | A | * | 11/1999 | Kleefisch et al. | 422/211 |

FOREIGN PATENT DOCUMENTS

| EP | 0 125 565 | 11/1984 |
| EP | 0 199 878 | 11/1986 |
| EP | 0 217 532 | 4/1987  |
| EP | 0 221 263 | 5/1987  |
| EP | 0 262 947 | 4/1988  |
| EP | 0 337 809 | 10/1989 |
| EP | 0 406 896 | 1/1991  |
| EP | 0 495 534 | 7/1992  |
| EP | 0 548 679 | 6/1993  |
| EP | 0 640 561 | 3/1995  |
| EP | 0 715 879 | 6/1996  |
| GB | 2 048 101 | 12/1980 |
| WO | 92/05861  | 4/1992  |
| WO | 96/00186  | 1/1996  |
| WO | 96/16737  | 6/1996  |

OTHER PUBLICATIONS

U.S. Appl. No. 60/543,778, filed Feb. 11, 2004, Hayes, Dyslexia Glasses That Remove the Problems Associated with Visual Dyslexia.
U.S. Appl. No. 60/523,778, filed Nov. 20, 2003, Hayes, Pixelated Phase–Mask Interferometer.
U.S. Appl. No. 60/439,294, filed Jan. 10, 2003, Hayes, Network Governor System Conceptual Design Document.
U.S. Appl. No. 60/381,794, filed May 21, 2002, Hayes, Tracking Device for People.
U.S. Appl. No. 60/349,515, filed Jan. 18, 2002, Hayes, Intelligent Network Wireless Telephone Call Processing.
U.S. Appl. No. 60/264,834, filed Jan. 30, 2001, Hayes, Telescoping Bed Urinal with Flushing Attachment on Portable Caster Stand.
U.S. Appl. No. 60/260,373, filed Jan. 8, 2001, Hayes, Mattress and Bedpan Pillow System.
U.S. Appl. No. 60/226,103 filed Aug. 17, 2000, Hayes, Method And System for Synthesizing Digital Circuits with Unateness Properties.
U.S. Appl. No. 60/210,018, filed Jun. 8, 2000, Hayes, Adjustable Bed Urinal with Flushing Attachment.
U.S. Appl. No. 10/838,694, filed May 4, 2004, Hayes, Pixelated Phase–Mask Interferometer.
U.S. Appl. No. 10/788,066, filed Feb. 26, 2004, Hayes, Process for Production of Polymer Polyols.
U.S. Appl. No. 10/755857, filed Jan. 12, 2004, Hayes, System and Method for Enabling and Enhancing Spending Limits Functionality in Post–Paid Wireless Billing Systems.
U.S. Appl. No. 10/752,709, filed Jan. 8, 2004, Hayes, Mattress and Bedpan Cushion System Using an Air Pressure Switch and Reservoir.

(Continued)

Primary Examiner—Michael Barr
Assistant Examiner—Monique Wills
(74) Attorney, Agent, or Firm—RatnerPrestia

(57) ABSTRACT

A process for the catalytic generation of hydrogen by the self-sustaining combination of partial oxidation and steam reforming of a hydrocarbon comprises containing a mixture of the hydrocarbon, an oxygen-containing gas and steam with a catalyst comprising rhodium dispersed on a refractory oxide support material which is a mixture of ceria and zirconia. The hydrocarbons are straight chain or branch chain hydrocarbons having 1 to 15 carbon atoms and include methane, propane, butane, hexane, heptane, normal-octane, iso-octane, naphthas, liquefied petroleum gas and reformulated gasoline petrol and diesel fuels. The hydrogen generation process can be started by feeding the hydrocarbon and air to initiate partial oxidation, before steam is added. The hydrogen generation process can be started by feeding the hydrocarbon and air to initiate partial oxidation, before steam is added. The hydrogen generation process also may be operated in combination with a water-gas shift reaction for the reduction of carbon monoxide in the hydrogen generated.

19 Claims, No Drawings

OTHER PUBLICATIONS

U.S. Appl. No. 10/704,974, filed Nov. 12, 2003, Hayes, Masonry Wall Anchoring Device, System, and Anchoring Method.
U.S. Appl. No. 10/367,926, filed Jan. 1, 2001, Hayes, Two Compartment Tray with Utensil Holder.
U.S. Appl. No. 10/652,903, filed Aug. 29, 2003, Hayes, Common Optical–Path Testing of High–Numerical–Aperture Wavefronts.
U.S. Appl. No. 10/405,419, filed Apr. 3, 2003, Hayes, Rotary Edging Blade System.
U.S. Appl. No. 10/689,540, filed Oct. 21, 2003, Hayes, Transporting Fibre Channel Over Ethernet.
U.S. Appl. No. 10/347,110 filed Jan. 17, 2003, Hayes, Wireless Telephone Call Processing.
U.S. Appl. No. 10/342,708, filed Jan. 14, 2003, Hayes, Water Purification System.
U.S. Appl. No. 10/299,104, filed Nov. 18, 2002, Hayes, Selective Offloading of Protocol Processing.
U.S. Appl. No. 10/260,498, filed Sep. 30, 2002, Hayes, Processes for Preparing Ethylene Oxide–Capped Polyols.
U.S. Appl. No. 10/231,188, filed Aug. 30, 2002, Hayes, Mattress and Bedpan Cushion System.
U.S. Appl. No. 10/199,916, filed Jul. 19, 2002, Hayes, Activated Starter Mixtures and the Processes Related Thereto.
U.S. Appl. No. 10/186,247, filed Jun. 28, 2002, Hayes, Advertising Demographics Reporting System.
U.S. Appl. No. 10/152,794, filed May 23, 2002, Hayes, Mattress Cavity Cushion System.
U.S. Appl. No. 10/104,138, filed Mar. 22, 2002, Hayes, Multiple Input Single–Stage Inductive Charger.
U.S. Appl. No. 10/094,425, filed Mar. 5, 2002, Hayes, Concealing a Network Connected Device.
U.S. Appl. No. 10/032,739, filed Jan. 2, 2002, Hayes, Mattress Cavity Cushion System.
U.S. Appl. No. 10/027,984, filed Dec. 21, 2001, Hayes, System and Method for Networked Royalty Program.
U.S. Appl. No. 09/946,144, filed Sep. 4, 2001, Hayes, Selective Offloading of Protocol Processing.
U.S. Appl. No. 09/931,131, filed Aug. 16, 2001, Hayes, Method and System for Synthesizing a Circuit Representation Into a New Circuit Representation Having Greater Unateness.
U.S. Appl. No. 09/932,378, filed Apr. 11, 2001, Hayes, Catalytic Generation of Hydrogen.
U.S. Appl. No. 09/788,288, filed Feb. 17, 2001, Hayes, Die Casting Vacuum Apparatus.
U.S. Appl. No. 09/659,436, filed Sep. 8, 2000, Hayes, Methodology to Optimize Positioning of Multi–Detector Gamma Cameras Utilizing Tangential Detector Motion.
U.S. Appl. No. 09/646,744, filed Dec. 29, 2000, Hayes, Catalytic Generation of Hydrogen.
U.S. Appl. No. 09/624,266, filed Jul. 24, 2000, Hayes, Data Communications System Using Email.
U.S. Appl. No. 09/499,308, filed Feb. 7, 2000, Hayes, Combat Pilot Aid System.
U.S. Appl. No. 08/918,081, filed Aug. 25, 1997, Hayes, Stabilizers for Polymer Polyols.
U.S. Appl. No. 08/643,401, filed May 6, 1996, Hayes, Circuit With Built–In Test and Method Thereof.
U.S. Appl. No. 07/829,545, filed Feb. 4, 1992, Hayes, Catalysts.
U.S. Appl. No. 07/519,856, filed May 7, 1990, Hayes, Video Scrambling, Audio Masking and Data Transmission Methods for Wireless Cable Systems.
U.S. Appl. No. 07/516,122, filed Apr. 27, 1990, Hayes, Multi–Exchange Paging System for Locating a Mobile Telephone in a Wide Area Telephone Network.
U.S. Appl. No. 07/515,836, filed Apr. 27, 1990, Hayes, Apparatus and Method for Directing Calls to Mobile Telephone Subscribers.
U.S. Appl. No. 07/226,347, filed Jul. 29, 1988, Hayes, Polyol Polyacrylate Dispersants.
U.S. Appl. No. 07/226,329, filed Jul. 29, 1988, Hayes, Polyacrylate Graft–Polyol Dispersants.
U.S. Appl. No. 06/871,494, filed Jun. 6, 1986, Hayes, Hot Electron Transistor.
U.S. Appl. No. 06/860,139, filed May 6, 1986, Hayes, Self–Aligned Fabrication Process for GAAS MESFET Devices.
U.S. Appl. No. 06/851,516, filed Apr. 14, 1986, Hayes, Controller Apparatus and Method for Heat Exchange System.
U.S. Appl. No. 06/371,743, filed Apr. 26, 1982, Hayes, Detection System for a Gas Chromatograph.
U.S. Appl. No. 06/314,329, filed Oct. 23, 1981, Hayes, Renewal of Sulfur Oxide Acceptor in FCC.
U.S. Appl. No. 09/832,378, filed Apr. 11, 2001, Carpenter, Catalytic Generation of Hydrogen.
U.S. Appl. No. 09/646,744, filed, Dec. 29, 2000, Carpenter, Catalytic Generation of Hydrogen.
U.S. Appl. No. 09/646,497, filed Jan. 1, 2001, Carpenter, Catalytic Generation of Hydrogen.
British Search Report dated Jun. 12, 1998, from British Application No. 9806199.7.
International Search Report dated Jun. 16, 1999, from International Application No. PCT/GB99/00753.
Jenkins, J.W. and Shutt, E., "The Hot Spot™ Reactor: Hydrogen Generation Using a Novel Concept," Platinum Metals Rev., 1989, vol. 33, No. 3, pp. 118–127.

* cited by examiner

CATALYTIC GENERATION OF HYDROGEN

This application is a continuation of U.S. patent application Ser. No. 09/646,497, filed on Sep. 18, 2000, now abandoned, which was the National Stage of International Application No. PCT/GB99/00753, filed Mar. 23, 1999.

This invention relates to the catalytic generation of hydrogen from hydrocarbons.

Hydrogen is currently used mainly in industry, in activities such as the manufacture of fertilisers, petroleum processing, methanol synthesis, annealing of metals and producing electronic materials. In the foreseeable future, the emergence of fuel cell technology will extend the use of hydrogen to domestic and vehicle applications.

A fuel cell works best when the anode is supplied with neat hydrogen. In the design of practical systems, however, other factors also need to be considered, including the availability, cost, supply, distribution, storage and release of clean hydrogen. When all these factors are taken into consideration, alternative methods of fueling can shown an overall advantage.

The issue of fueling is very dependent on the type of application. For example, the design of fuel cell powered passenger vehicles requires a compact and responsive supply of hydrogen which must provide comparable driving performance to that of a combustion powered vehicle, as well as achieving higher efficiency and improved emission standards. Although conventional and novel on-board hydrogen storage options are being developed, these do not seem likely to meet the target requirements for mass, size and cost, in time to be used for the first generation of fuel cell vehicles. Instead, the technology most likely to be implemented in the short term is the on-board generation of hydrogen from a liquid or liquefied fuel. On the other hand, the design of domestic systems for generating heat and fuel cell power is less constrained by the need for compactness and speed of response. Furthermore, as the most widely available domestic fuel is natural gas, the efficient conversion of methane to hydrogen is seen as a key development target.

New fuel-processing technologies for generating hydrogen tend to be based either on steam-reforming or on partial oxidation. Each approach has its merits. Partial oxidation is a fast exothermic process, resulting in rapid start-up and short response times. Steam reforming is endothermic and very efficient, producing hydrogen from both the fuel and the steam.

However, our work on system simulations leads us to predict that, in terms of efficiency, the ideal fuel-processor is likely to function by a combination of partial oxidation and steam reforming. In our previous work, (see EP 0217532; EP 0262947; WO 96/00186 and Platinum Metals Review; 1989, 33 (3) 118–127), we have shown that the two reactions can be carried out simultaneously in the same catalyst bed using a catalytic hydrogen generator which has become known as the HotSpot™ reactor. The process which takes place in the HotSpot reactor is a self-sustaining combination of exothermic partial oxidation and endothermic steam-reforming to produce a gas-stream containing mainly hydrogen, carbon dioxide and nitrogen, and is characterised by a low rate of carbon monoxide formation.

EP-A-548679 relates to a catalytic oxidation process for the production of synthetic gases with high content of carbon monoxide and hydrogen.

Possibly, the easiest fuel to process is methanol. The merits of methanol are well documented and include:
(i) low propensity for soot formation;
(ii) absence of contaminants (especially sulphur);
(iii) possibility of production from renewable sources; and
(iv) availability of compatible components.

However, the disadvantages of methanol are equally familiar, notably:
(i) relatively high toxicity;
(ii) high affinity for water, resulting in corrosiveness;
(iii) absence of infrastructure for supplying vehicle fueling stations; and
(iv) unsuitability for domestic use.

Although there has been considerable progress in the development of on-board methanol steam reformers, because of the above-mentioned disadvantages of methanol, it is by no means certain that methanol will be widely adopted by the manufacturers of fuel-cell vehicles. For domestic applications natural gas is overwhelmingly the preferred choice.

The question of supplying and distribution, in particular, has emerged as one of the key issues in the debate on the fueling of fuel-cell systems, with a strong case being made for the use of the most widely available fuels. This caused us to further investigate the feasibility of generating hydrogen from hydrocarbon fuels by the self-sustaining reaction of air and steam as can be accomplished inter alia by our HotSpot reactor.

An object of the present invention, therefore, is to provide an improved process for generating hydrogen from hydrocarbons by a self-sustaining combination of partial oxidation and steam reforming.

In the course of our investigations we have identified a catalyst species which is extremely effective for oxidatively reforming (ie by the combination of partial oxidation and steam reforming) hydrocarbons allowing hydrogen to be formed with high selectivity.

According to the present invention there is provided a process for the catalytic generation of hydrogen by the self-sustaining combination of partial oxidation and steam reforming of a hydrocarbon comprising contacting a mixture of the hydrocarbon and an oxygen-containing gas and steam with a catalyst comprising rhodium dispersed on a refractory oxide support material which comprises as cations cerium and zirconium.

Preferably, steam is introduced into the mixture of hydrocarbon and oxygen-containing gas after the self-sustaining partial oxidation of the hydrocarbon has commenced.

Further preferably, the hydrocarbon is a straight chain or branch chain hydrocarbon having 1 to 15 carbon atoms, conveniently 1 to 7 carbon atoms.

Suitably, the hydrocarbon is selected from methane, propane, butane, hexane, heptane, normal-octane, iso-octane, naphthas, liquefied petroleum gas, reformulated petrol and diesel-type fuels.

Suitably, the oxygen-containing gas is air.
Suitably, the oxygen-containing gas is air.
Preferably, rhodium comprises 0.1 weight % to 5 weight % of the total weight of the supported catalyst, conveniently 0.2 weight % to 2.5 weight %.

Preferably, the refractory oxide support material is a mixture of ceria and zirconia.

Preferably, the weight ratio of ceria to zirconia in the catalyst support material is from 0.5 to 99.5 to 99.5 to 0.5, conveniently from 5 to 95 to 95 to 5.

Preferably, the catalyst is pre-heated to a temperature at which self-sustaining partial oxidation of the hydrocarbon commences. The catalyst may be pre-heated by direct heating or catalytic heating.

Further preferably, the catalytic heating method comprises feeding to the catalyst an oxygen-containing gas and an initiating compound which is more easily oxidisable than the hydrocarbon to be partially oxidised, suitably, methanol, hydrogen or dimethyl ether.

Preferably, the mixture of hydrocarbon and oxygen-containing gas is fed to the catalyst when the catalyst has reached the temperature at which self-sustaining partial oxidation of the hydrocarbon will occur.

The present invention in a preferred form is a self-sustaining combination of partial oxidation and steam reforming of the hydrocarbon, the steam reforming being conducted by introducing steam into the mixture of hydrocarbon and oxygen-containing gas after the self-sustaining partial oxidation of the hydrocarbon has commenced.

The process of the present invention may be operated in combination with a catalysed water-shift reaction for the reduction of carbon monoxide in the hydrogen produced from the hydrocarbon.

The catalyst for the water-gas shift reaction preferably is a copper or iron based catalyst.

The water-gas shift reaction catalyst may be added to the rhodium based catalyst for the hydrogen generation reaction.

From yet another aspect, the present invention is the use in a fuel cell system of the process as defined above for the catalytic generation of hydrogen.

We have found that a high proportion of zirconia induces a lower light-off temperature, but results in a higher temperature for self-sustaining operation and so causes more rapid deactivation of the catalyst whereas a high proportion of ceria lowers the temperature of self-sustaining operation and improves durability.

Advantages of the process of the present invention include the following:
(i) it allows existing infrastructure straight chain hydrocarbon fuels to be used for the generation of hydrogen;
(ii) it allows for highly compact and responsive hydrogen generation;
(iii) it is self-sustaining;
(iv) it operates at comparatively low temperatures;
(v) it produces mainly hydrogen and carbon dioxide without the need for one or more separate or integral water shift reactors (and thus is a considerable improvement over existing fuel generation technologies);
(vi) there is little or no carbon deposition on the catalyst;
(vii) there is no evidence of sulphur poisoning of the catalyst; and
(viii) it provides a catalyst system which shows high conversion efficiency and high selectivity towards the formation of hydrogen.

The present invention is further described by way of the following illustrative Examples.

The following background information is given with respect to the illustrative Examples.

(i) Micro-scale Reactor Temperature-programmed Experiments

A micro-reactor test rig was designed to measure the rate of hydrogen generation and to provide a complete product analysis during:
(a) temperature-programmed reaction of each fuel with air and air/water: and
(b) self-sustaining oxidative reforming of each fuel.

For each fuel, optimum experimental conditions for partial oxidation and auto-thermal reforming were calculated. The reactor was then furnace heated up to the initial temperature to be studied, this was the minimum temperature required to maintain any liquid feed(s) in the vapour phase. When the temperature had stabilised, the calculated flows were introduced to the catalyst and the composition of the exit stream was analysed. The reactants were always supplied in the gas phase, ie liquid feeds were pre-vaporised. The furnace temperature was then increased incrementally until full conversion of the fuel was achieved. When the conditions for maximum hydrogen generation were established, further experiments were carried out to see if varying the air, fuel or water feeds would further improve the hydrogen output.

(ii) Micro-scale Catalyst Stability Tests

After optimising the conditions for hydrogen generation for each catalyst/fuel combination, a durability test was carried out for 6–8 hours under those conditions. The reformate composition was recorded at hourly intervals. Decline in catalyst activity could be monitored from any change in hydrogen output. After completion of the test, the catalyst was inspected for any signs of carbon retention.

(iii) Micro-scale Reactor Self-sustaining Experiments and HotSpot Reactor Experiments Light-off could be induced by raising the catalyst bed temperature either by direct heating (using the furnace) or by catalytic heating (by feeding hydrogen and air at ambient temperature). When the catalyst bed reached the light-off temperature (known from the temperature-programmed experiments), the furnace was removed or the hydrogen/air feed was switched to fuel/air. When the calculated optimum temperature for auto-thermal operation was reached, water was introduced to the feed stream.

For scaled-up experiments using a HotSpot reactor, the basic method as outlined for micro-scale reactor self-sustaining experiments was employed.

(iv) Methane

This was used as a model for natural gas (See Examples 1 to 3).

(v) Straight Chain Naphtha

Heptane was used as a model for straight run naphtha (see Example 4).

(vi) Reformulated Gasoline (RFG)

Reformulated gasoline (RFG) contains straight and branch chain hydrocarbons, aromatics, oxygenates and sulphur compounds but is composed mainly of straight chain hydrocarbons (see Example 5).

(vii) Gasoline

Straight chain normal-octane and branch chain iso-octane were used as models for gasoline (See Examples 6 and 7).

(viii) AVCAT

AVCAT is an aviation turbine fuel, which was used because of its compositional similarity to diesel fuel (See Example 8).

EXAMPLE 1

Temperature-programmed Methane Reforming

A batch of catalyst with a nominal composition of 1% $Rh/CeO_2$—$ZrO_2$ (based on the proportions of precursors) was prepared by impregnating 50 g of 50:50 (by mass) ceria-zirconia support material with an aqueous Rh-salt solution. The required amount of impregnating solution (30 $cm^3$) was prepared by adding distilled water to 3.64 g of aqueous rhodium(III) nitrate containing 0.5 g rhodium.

The impregnating solution was added to the support material and mixed thoroughly. Excess water was removed from the resultant paste, which was then left for 2 hours to form a semi-rigid cake. After breaking-up the cake, the lumps were dried at 120° C. for 8 hours, before being calcined in static air at 500° C. for 2 hours. Finally, the catalyst was crushed, pelletised (using a pressure of 8500 kg $cm^{-2}$ for 15 min) and sieved to collect granules in the range 0.3–0.8 mm diameter. No special activation was required prior to testing.

A small bed (0.2 g) of the granulated catalyst prepared as above was loaded into a tubular quartz reactor, which was positioned at the centre of a furnace. A mixture of methane (9.5 standard $cm^3min^{-1}$), air (25 standard $cm^3min^{-1}$) and steam (31 standard $cm^3min^{-1}$) was passed through the catalyst bed, while the temperature inside the furnace was raised at 2° C. $min^{-1}$ from 105° C. to 800° C. The rate of hydrogen production peaked when the catalyst bed temperature reached 555° C. At this temperature, 98.5% of the methane was converted to a reformate containing 21% $H_2$, 6% $CO_2$ 0.9% CO and 65% $N_2$ (plus water and unreacted methane).

EXAMPLE 2

Self-sustaining Methane Reforming on Micro-reactor Scale

A bed (1.0 g) of the catalyst prepared in Example 1 was loaded into a quartz reactor. Unlike Example 1, however, no external heat was supplied by the furnace in this Example 2. Instead, the catalyst bed was initially heated by feeding hydrogen (200 standard $cm^3min^{-1}$) and air (174 standard $cm^3min^{-1}$). When the bed temperature reached 600° C., the gas-feed was switched to methane (40 standard $cm^3min^{-1}$) and air (174 standard $cm^3min^{-1}$). Under these partial oxidation conditions, the bed temperature stabilised at 625° C., and the methane conversion reached 45%. The composition of the reformate was 10.5% $H_2$, 9% $CO_2$, 1.8% CO, 12% $CH_4$ and 60% $N_2$ (plus water).

When the gas-feed was changed to methane (24 standard $cm^3min^{-1}$), air (130 standard $cm^3min^{-1}$) and steam (124.5 standard $cm^3min^{-1}$), the bed temperature dropped to 605° C., but the $H_2$ concentration in the reformate rose to 12.5%. Under these conditions, the catalyst was functioning by a self-sustaining combination of partial oxidation and steam reforming of methane. Furthermore, by reducing the heat loss from the reactor, the amount of steam reforming could be increased. This resulted in 97% conversion of methane, and a reformate containing 24% $H_2$, 11.5% $CO_2$, 0.8% CO and 49% $N_2$ (plus water and unreacted methane). There was no sign of de-activation during 7 hours of testing.

EXAMPLE 3

HotSpot Reforming of Methane

A radial bed (80 g) of the catalyst prepared in Example 1 was tested using a suitably modified HotSpot reactor. The HotSpot reactor allows multiple injection of fuel, water and air in a catalyst bed which catalyses partial oxidation and steam reforming of the fuel. Based on the results of Example 2, the HotSpot reactor was modified to include thermal insulation (to prevent heat losses from the reactor) and high-temperature connectors and fittings (to tolerate the high temperatures compared to methanol reforming).

The temperature of the radial catalyst bed was raised by feeding hydrogen (0.85 standard liter $min^{-1}$) and air (2.6 standard liter $min^{-1}$). When the bed temperature reached 600° C., the gas-feed was switched to methane (1.14 standard liter $min^{-1}$) and air (4.67 standard liter $min^{-1}$). The catalyst temperature remained at 600° C. during the partial oxidation of methane. Dry analysis of the reformate, by gas chromatography and non-dispersive IR, showed 15% $H_2$, 3% $CO_2$, 2% CO, 66% $N_2$ and 14% $CH_4$.

When the water was added to the gas feed (by vaporising liquid at a rate of 4.6 $cm^3min^{-1}$), the HotSpot reactor began to function by a self-sustaining combination of partial oxidation and steam reforming. This had the effect of lowering the bed temperature (to 540° C.), but raising methane conversion to 97% and the rate of hydrogen production (to 135 liter $h^{-1}$). Dry analysis of the reformate now showed 32% $H_2$, 13% $CO_2$, 1.3% CO, 53% $N_2$ and 0.8% $CH_4$. When the feed rates were changed (to methane: 6.49 standard liter $min^{-1}$; air: 18.74 standard liter $min^{-1}$; steam: 6.31 standard liter $min^{-1}$), the hydrogen output rose to 585 liter $h^{-1}$, and remained stable during 7 hours of testing.

EXAMPLE 4

Self-sustaining Heptane Reforming on Micro-reactor Scale

A batch of catalyst was prepared by the method described in Example 1, except that the support material was 80:20 (by mass) ceria-zirconia.

A bed (0.2 g) of catalyst prepared as above, was loaded into a quartz reactor. The catalyst bed temperature was raised to 200° C. by furnace heating. The furnace was then switched off, before heptane vapour (3.8 $cm^3min^{-1}$) and air (64.5 $cm^3min^{-1}$) were passed through the catalyst bed. When the catalyst reached 575° C., steam was added (124.4 $cm^3min^{-1}$) and the air feed-rate was decreased (to 24.1 $cm^3min^{-1}$). The catalyst temperature stabilised at 625° C. The hydrogen concentration of the dried reformate was 22%.

EXAMPLE 5

Self-sustaining Reformulated Gasoline on Micro-reactor Scale

A fresh bed (0.2 g) of the catalyst prepared in Example 4 was loaded into a quartz reactor. The catalyst bed temperature was raised to 200° C. by furnace heating. The furnace was then switched off, before reformulated gasoline vapour (produced by vaporising the liquid at a rate of 1.5 $cm^3$ $hour^{-1}$) and air (62.8 $cm^3min^{-1}$) were passed through the catalyst bed. When the catalyst reached 600° C., steam was added (62.5 $cm^3min^{-1}$), and the bed temperature stabilised at 590° C. The hydrogen concentration of the dried reformate was 28.5%.

EXAMPLE 6

Temperature-programmed Reforming of Normal-Octane

A bed (0.2 g) of the catalyst prepared in Example 1 was loaded into a quartz reactor, which was positioned at the centre of a furnace. A mixture of normal-octane vapour (produced by vaporising the liquid at a rate of 4 $cm^3$ $hour^{-1}$), air (175 $cm^3$ $min^{-1}$) and steam (produced by vaporising water at a rate of 4 $cm^3$ $hour^{-1}$) was passed through the catalyst bed, while the temperature inside the furnace was raised at 2° $min^{-1}$ from 400° C. to 650° C. The rate of hydrogen production reached a plateau when the catalyst bed temperature reached 550° C. At this temperature, all the normal-octane was converted to a reformate, which when dried contained 37% $H_2$, 12% $CO_2$, 7% and nitrogen. There was no sign of de-activation, when the catalyst bed temperature was maintained at 550° C. for 4 hours.

EXAMPLE 7

Temperature-programmed Reforming of Iso-Octane

The experimental procedure described in Example 6 above was followed exactly, except that the normal-octane was replaced by iso-octane. Again, the rate of hydrogen production reached a plateau when the catalyst bed temperature reached 550° C. At this temperature, all the iso-octane was converted to a reformate, which when dried contained 33% $H_2$, 15% $CO_2$, 5% CO and nitrogen. There was no sign of de-activation, when the catalyst bed temperature was maintained at 550° C. for 4 hours.

EXAMPLE 8

Temperature-programmed Reforming of AVCAT

A bed (0.2 g) of the catalyst prepared in Example 1 was loaded into a quartz reactor, which was positioned at the centre of a furnace. A mixture of AVCAT fuel (produced by vaporising the liquid at a rate of 4 $cm^3$ $hour^{-1}$), air (300 $cm^3$ $min^{-1}$) and steam (produced by vaporising water at a rate of 4 $cm^3$ $hour^{-1}$) was passed through the catalyst bed, while the temperature inside the furnace was raised at 2° $min^{-1}$ from 400° C. to 650° C. The rate of hydrogen production reached a plateau when the catalyst bed temperature reached 600° C. At this temperature, most of the AVCAT fuel was converted to a reformate, which when dried contained 28% $H_2$, 14% $CO_2$, 3% CO and nitrogen. When held at this temperature, there was some de-activation during the first hour, but then the output stablilised at 24% $H_2$, 14% $CO_2$, 3% CO and nitrogen.

What is claimed is:

1. A process for the catalytic generation of hydrogen by the self-sustaining combination of partial oxidation and steam-reforming of a hydrocarbon comprising contacting a mixture of the hydrocarbon and an oxygen-containing gas and steam with a catalyst comprising rhodium dispersed on a refractory oxide support material which comprises as cations cerium and zirconium, wherein the weight ratio of cerium to zirconium in the support material is from 50:50 to 99.5:0.5.

2. A process according to claim 1 wherein the stream is combined with the hydrocarbon and the oxygen-containing gas to form the mixture after the self-sustaining partial oxidation of the hydrocarbon has commenced.

3. A process according to claim 1 wherein the hydrocarbon is a straight chain hydrocarbon or a branch chain hydrocarbon.

4. A process according to claim 3 wherein the hydrocarbon contains 1 to 15 carbon atoms.

5. A process according to claim 4 wherein the hydrocarbon contains 1 to 7 carbon atoms.

6. A process according to claim 1 wherein the hydrocarbon is selected from methane, propane, butane, hexane, heptane, normal-octane, iso-octane, naphthas, liquified petroleum gas, reformulated petrol and diesel-type fuels.

7. A process according to claim 1 wherein the oxygen-containing gas is air.

8. A process according to claim 1 wherein rhodium comprises 0.1 weight per cent to 5 weight per cent of the total weight of the supported catalyst.

9. A process according to claim 8 wherein rhodium comprises 0.2 weight per cent to 2.5 weight per cent of the total weight of the supported catalyst.

10. A process according to claim 1 wherein the refractory oxide support material is a mixture of ceria and zirconia.

11. A process according to claim 1 wherein the catalyst is pre-heated to a temperature at which self-sustaining partial oxidation of the hydrocarbon commences.

12. A process according to claim 11 wherein the catalyst is pre-heated by direct heating to a temperature at which self-sustaining partial oxidation of the hydrocarbon commences.

13. A process according to claim 11 wherein the catalyst is pre-heated by catalytic heating to a temperature at which self-sustaining partial oxidation of the hydrocarbon commences.

14. A process according to claim 13 wherein the catalyst is pre-heated by feeding to the catalyst an oxygen-containing gas and an initiating compound which is more easily oxidizable than the hydrocarbon which is to be partially oxidized.

15. A process according to claim 14 wherein the initiating compound is selected from methanol, hydrogen and dimethyl ether.

16. A process according to claim 1 wherein the mixture of the hydrocarbon and the oxygen-containing gas is fed to the catalyst when the catalyst has reached the temperature at which self-sustaining partial oxidation of the hydrocarbon will occur.

17. A process as claimed in claim 1 operated in combination with a catalysed water-gas shift reaction for the reduction of carbon monoxide in the hydrogen produced from the hydrocarbon.

18. A process as claimed in claim 17 wherein the catalyst for the water-gas shift reaction is a copper or iron based catalyst.

19. A process according to claim 17 wherein the water-gas shift reaction catalyst is added to the rhodium based catalyst for the hydrogen generation reaction.

* * * * *

UNITED STATES PATENT AND TRADEMARK OFFICE
CERTIFICATE OF CORRECTION

| | | |
|---|---|---|
| PATENT NO. | : 6,887,455 B2 | |
| APPLICATION NO. | : 09/832378 | |
| DATED | : May 3, 2005 | |
| INVENTOR(S) | : Carpenter et al. | |

It is certified that error appears in the above-identified patent and that said Letters Patent is hereby corrected as shown below:

On the cover page, at (56), References Cited, under "OTHER PUBLICATIONS," delete the following references:

U.S. Appl. No. 60/543,778, filed Feb. 11, 2004, Hayes, Dyslexia Glasses That Remove the Problems Associated with Visual Dyslexia.

U.S. Appl. No. 60/523,778, filed Nov. 20, 2003, Hayes, Pixelated Phase-Mask Interferometer.

U.S. Appl. No. 60/439,294, filed Jan. 10, 2003, Hayes, Network Governor System Conceptual Design Document.

U.S. Appl. No. 60/381,794, filed May 21, 2002, Hayes, Tracking Device for People.

U.S. Appl. No. 60/349,515, filed Jan. 18, 2002, Hayes, Intelligent Network Wireless Telephone Call Processing.

U.S. Appl. No. 60/264,834, filed Jan. 30, 2001, Hayes, Telescoping Bed Urinal with Flushing Attachment on Portable Caster Stand.

U.S. Appl. No. 60/260,373, filed Jan. 8, 2001, Hayes, Mattress and Bedpan Pillow System.

U.S. Appl. No. 60/226,103 filed Aug. 17, 2000, Hayes, Method And System for Synthesizing Digital Circuits with Unateness Properties.

U.S. Appl. No. 60/210,018, filed Jun. 8, 2000, Hayes, Adjustable Bed Urinal with Flushing Attachment.

U.S. Appl. No. 10/838,694, filed May 4, 2004, Hayes, Pixelated Phase-Mask Interferometer.

U.S. Appl. No. 10/788,066, filed Feb. 26, 2004, Hayes, Process for Production of Polymer Polyols.

U.S. Appl. No. 10/755857, filed Jan. 12, 2004, Hayes, System and Method for Enabling and Enhancing Spending Limits Functionality in Post-Paid Wireless Billing Systems.

UNITED STATES PATENT AND TRADEMARK OFFICE
CERTIFICATE OF CORRECTION

| | |
|---|---|
| PATENT NO. | : 6,887,455 B2 |
| APPLICATION NO. | : 09/832378 |
| DATED | : May 3, 2005 |
| INVENTOR(S) | : Carpenter et al. |

It is certified that error appears in the above-identified patent and that said Letters Patent is hereby corrected as shown below:

U.S. Appl. No. 10/752,709, filed Jan. 8, 2004, Hayes, Mattress and Bedpan Cushion System Using an Air Pressure Switch and Reservoir.

U.S. Appl. No. 10/704,974, filed Nov. 12, 2003, Hayes, Masonry Wall Anchoring Device, System, and Anchoring Method.

U.S. Appl. No. 10/367,926, filed Jan. 1, 2001, Hayes, Two Compartment Tray with Utensil Holder.

U.S. Appl. No. 10/652,903, filed Aug. 29, 2003, Hayes, Common Optical-Path Testing of High Numerical-Aperture Wavefronts.

U.S. Appl. No. 10/405,419, filed Apr. 3, 2003, Hayes, Rotary Edging Blade System.

U.S. Appl. No. 10/689,540, filed Oct. 21, 2003, Hayes, Transporting Fibre Channel Over Ethernet.

U.S. Appl. No. 10/347,110 filed Jan. 17, 2003, Hayes, Wireless Telephone Call Processing.

U.S. Appl. No. 10/342,708, filed Jan. 14, 2003, Hayes, Water Purification System.

U.S. Appl. No. 10/299,104, filed Nov. 18, 2002, Hayes, Selective Offloading of Protocol Processing.

U.S. Appl. No. 10/260,498, filed Sep. 30, 2002, Hayes, Processes for Preparing Ethylene Oxide-Capped Polyols.

U.S. Appl. No. 10/231,188, filed Aug. 30, 2002, Hayes, Mattress and Bedpan Cushion System.

U.S. Appl. No. 10/199,916, filed Jul. 19, 2002, Hayes, Activated Starter Mixtures and the Processes Related Thereto.

U.S. Appl. No. 10/186,247, filed Jun. 28, 2002, Hayes, Advertising Demographics Reporting System.

U.S. Appl. No. 10/152,794, filed May 23, 2002, Hayes, Mattress Cavity Cushion System.

UNITED STATES PATENT AND TRADEMARK OFFICE
CERTIFICATE OF CORRECTION

| | |
|---|---|
| PATENT NO. | : 6,887,455 B2 |
| APPLICATION NO. | : 09/832378 |
| DATED | : May 3, 2005 |
| INVENTOR(S) | : Carpenter et al. |

It is certified that error appears in the above-identified patent and that said Letters Patent is hereby corrected as shown below:

U.S. Appl. No. 10/104,138, filed Mar. 22, 2002, Hayes, Multiple Input Single-Stage Inductive Charger.

U.S. Appl. No. 10/094,425, filed Mar. 5, 2002, Hayes, Concealing a Network Connected Device.

U.S. Appl. No. 10/032,739, filed Jan. 2, 2002, Hayes, Mattress Cavity Cushion System.

U.S. Appl. No. 10/027,984, filed Dec. 21, 2001, Hayes, System and Method for Networked Royalty Program.

U.S. Appl. No. 09/946,144, filed Sep. 4, 2001, Hayes, Selective Offloading of Protocol Processing.

U.S. Appl. No. 09/931,131, filed Aug. 16, 2001, Hayes, Method and System for Synthesizing a Circuit Representation Into a New Circuit Representation Having Greater Unateness.

U.S. Appl. No. 09/932,378, filed Apr. 11, 2001, Hayes, Catalytic Generation of Hydrogen.

U.S. Appl. No. 09/659,436, filed Sep. 8, 200, Hayes, Methodology to Optimize Positioning of Multi-Detector Gamma Cameras Utilizing Tangential Detector Motion.

U.S. Appl. No. 09/646,744, filed Dec. 29, 2000, Hayes, Catalytic Generation of Hydrogen.

U.S. Appl. No. 09/624,266, filed Jul. 24, 2000, Hayes, Data Communication System Using Email.

U.S. Appl. No. 09/499,308, filed Feb. 7, 2000, Hayes, Combat Pilot Aid System.

U.S. Appl. No. 08/918,081, filed Aug. 25, 1997, Hayes, Stabalizers for Polymer Polyols.

U.S. Appl. No. 08/643,401, filed May 6, 1996, Hayes, Circuit With Built-In Test and Method Thereof.

UNITED STATES PATENT AND TRADEMARK OFFICE
CERTIFICATE OF CORRECTION

| | |
|---|---|
| PATENT NO. | : 6,887,455 B2 |
| APPLICATION NO. | : 09/832378 |
| DATED | : May 3, 2005 |
| INVENTOR(S) | : Carpenter et al. |

It is certified that error appears in the above-identified patent and that said Letters Patent is hereby corrected as shown below:

U.S. Appl. No. 07/829,545, filed Feb. 4, 1992, Hayes, Catalysts.

U.S. Appl. No. 07/519,856, filed May 7, 1990, Hayes, Video Scrambling, Audio Masking and Data Transmission Methods for Wireless Cable Systems.

U.S. Appl. No. 07/516,122, filed Apr. 27, 1990, Hayes, Multi-Exchange Paging System for Locating a Mobile Telephone in a Wide Area Telephone Network.

U.S. Appl. No. 07/515,836, filed Apr. 27, 1990, Hayes, Apparatus and Method for Directing Calls to Mobile Telephone Subscribers.

U.S. Appl. No. 07/226,347, filed Jul. 29, 1988, Hayes, Polyol Polyacrylate Dispersants.

U.S. Appl. No. 07/226,329, filed Jul. 29, 1988, Hayes, Polyacrylate Graft-Polyol Dispersants.

U.S. Appl. No. 06/871,494, filed Jun. 6, 1986, Hayes, Hot Electron Transistor.

U.S. Appl. No. 06/860,139, filed May 6, 1986, Hayes, Self-Aligned Fabrication Process for GAAS MESFET Devices.

U.S. Appl. No. 06/851,516, filed Apr. 14, 1986, Hayes, Controller Apparatus and Method for Heat Exchange System.

U.S. Appl. No. 06/371,743, filed Apr. 26, 1982, Hayes, Detection System for a Gas Chromatography.

U.S. Appl. No. 06/314,329, filed Oct. 23, 1981, Hayes, Renewal of Sulfur Oxide Acceptor in FCC.

U.S. Appl. No. 09/832,378, filed Apr. 11, 2001, Carpenter, Catalytic Generation of Hydrogen.

U.S. Appl. No. 09/646,744, filed, Dec. 29, 2000, Carpenter, Catalytic Generation of Hydrogen.

U.S. Appl. No. 09/646,497, filed Jan. 1, 2001, Carpenter, Catalytic Generation of Hydrogen.

UNITED STATES PATENT AND TRADEMARK OFFICE
CERTIFICATE OF CORRECTION

PATENT NO.       : 6,887,455 B2
APPLICATION NO.  : 09/832378
DATED            : May 3, 2005
INVENTOR(S)      : Carpenter et al.

It is certified that error appears in the above-identified patent and that said Letters Patent is hereby corrected as shown below:

U.S. Appl. No. 09/788,288, filed Feb. 17, 2001, Hayes, Die Casting Vacuum Apparatus.

Signed and Sealed this

Eighth Day of August, 2006

JON W. DUDAS
*Director of the United States Patent and Trademark Office*